Dec. 31, 1935.  F. I. GETTY  2,025,976
STEERING WHEEL CIRCUIT CLOSER
Filed Nov. 1, 1930  2 Sheets-Sheet 1
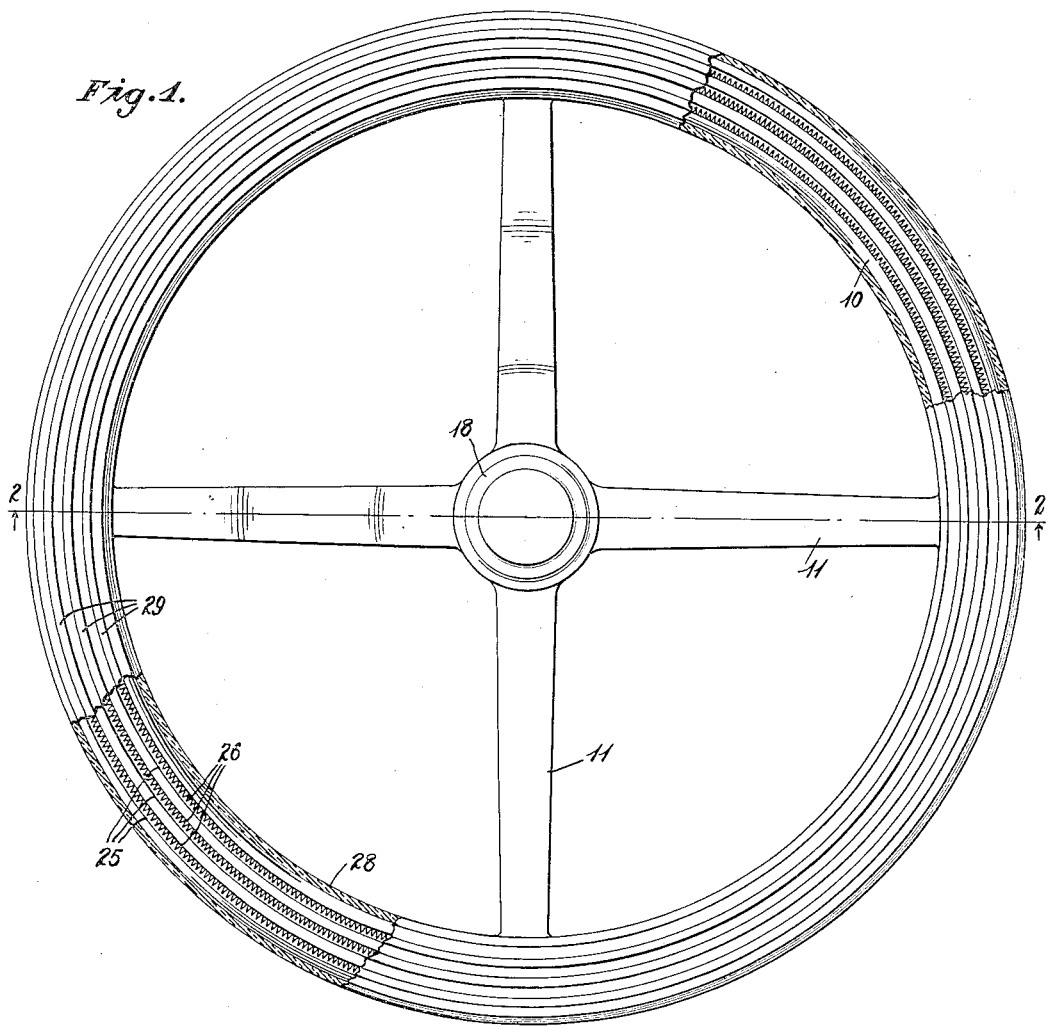
Fig. 1.
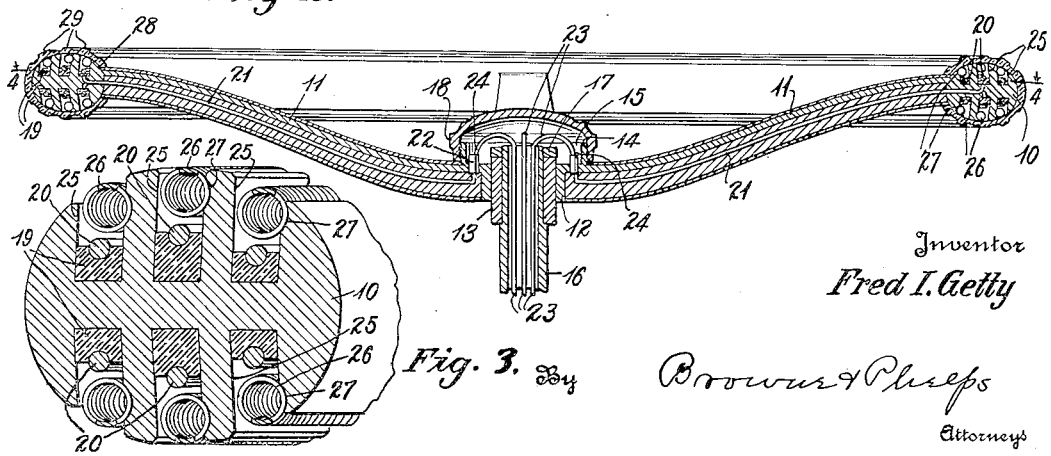
Fig. 2.
Fig. 3.
Inventor
Fred I. Getty
By Brower & Phelps
Attorneys

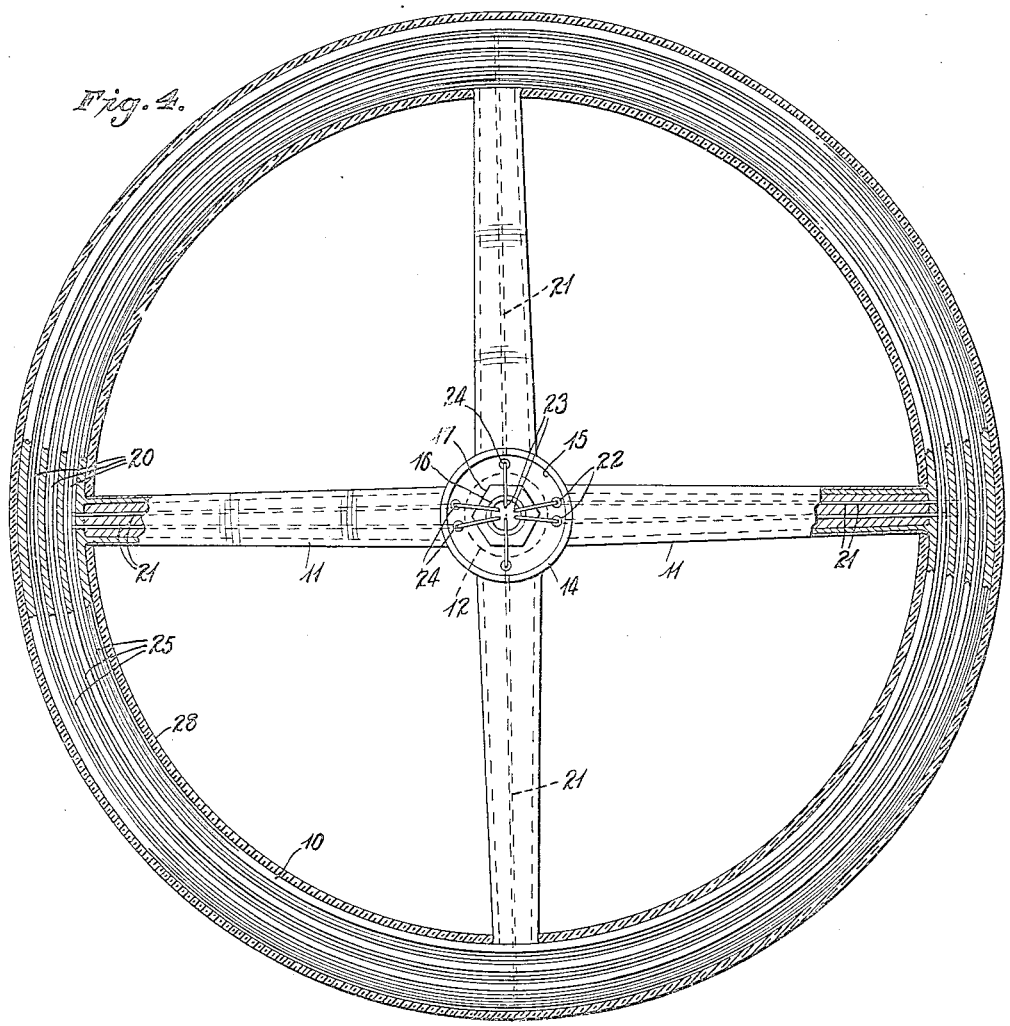
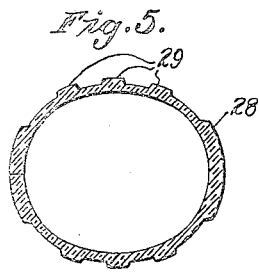
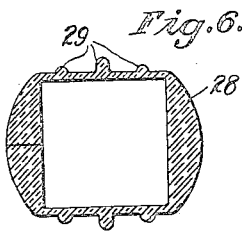
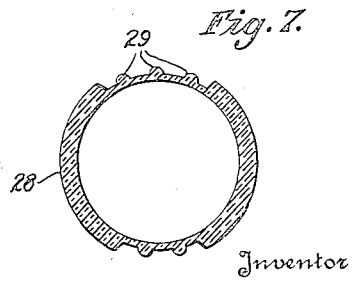
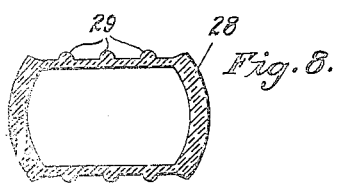

Patented Dec. 31, 1935

2,025,976

UNITED STATES PATENT OFFICE 2,025,976

STEERING WHEEL CIRCUIT CLOSER

Fred I. Getty, Jennings, La.

Application November 1, 1930, Serial No. 492,804

12 Claims. (Cl. 200—59)

The invention relates to circuit closers and has as an object the provision of circuit closers applicable to the steering wheels of vehicles.

It is an object of the invention to provide a form of circuit closer which may be applied in multiple to a steering wheel.

It is a further object of the invention to provide a steering wheel provided with a plurality of circuit closers for control of a plurality of electrically operated devices upon a vehicle.

It is a further object of the invention to provide a steering wheel embodying a plurality of circuit closers, the appearance of the wheel giving no indication of their presence.

It is a further object of the invention to provide a steering wheel having a plurality of circuit closers, any one of which may be operated by pressure at any point about the circumference of the wheel.

Further objects of the invention will appear from the following description when read in connection with the accompanying drawings showing an illustrative embodiment of the invention and wherein:

Fig. 1 is a plan view with a portion of the covering broken away;

Fig. 2 is a central vertical section on line 2—2 of Fig. 1;

Fig. 3 is an enlarged cross-section of the rim of the wheel with the covering omitted;

Fig. 4 is a horizontal section on line 4—4 of Fig. 2 showing the spokes in plan view and the central cap omitted;

Figs. 5, 6, 7 and 8 are cross sections of different shapes of coverings applicable to modified forms of the wheel.

As shown the device comprises a metallic rim 10 and spokes 11 projecting inwardly therefrom in metallic connection therewith. The hollow hub 12 of the wheel is shown as formed with a bushing 13 and an annular collar 14 to define a recess 15, the bushing 13 being shown as provided with splines to engage splines upon the steering column 16 to which the wheel may be secured as by means of a nut 17 engaging screw threads upon the steering column.

The chamber 15 is shown as closed by a cap 18 having screwthreaded connection with the outside of the collar 14.

In the metallic rim 10 are shown a plurality of annular grooves as more clearly shown in Fig. 3, said grooves being inclined from the perpendicular as there shown and in the bottom of each of said grooves is an annular ring 19 of insulating material as fibre or the like. Seated in and projecting above said rings 19, in each thereof is a contact member 20 which may be desirably formed of heavy wire and which extends continuously about the rim of the wheel in the bottom of each of the grooves therein. Each of said conductors 20 is shown as connected at one point with a separate wire 21 insulated from the metal of the rim and spokes and passing through hollows in the spokes and terminating in electrical connection with a socket 22 also insulated from the metal of the wheel.

Wires 23 are shown extending through the hollow steering column, with ends terminating in tips 24 engaging in the sockets 22. To cause electrical connection between the conductors 20 and the metal of the wheel and spokes there are shown endless electrical spring bands 26 seating in the grooves 25. The springs 26 before application to the wheel are of less diameter than the overall diameter of the grooves 25 so that the springs when seated in the grooves are placed under tension. To locate the springs 26 in the grooves 25 out of contact with the conductors 20, a recess 27 is formed in the inner side of each of said grooves 25 continuously about the wheel. When so formed and assembled pressure upon the surface of any one of the springs 26 will depress the same in the groove to contact with the corresponding conductor 20 and when the pressure is removed the tension upon the spring will cause the same to contract into the recess 27 thereby breaking the contact between the spring 26 and the conductor 20.

As clearly shown in Fig. 3, the surfaces of the vertical wall of the grooves 25 are formed on surfaces of cones. These surfaces if sufficiently extended would intersect the axis of the rim. By virtue of this formation the recesses 27 are not strictly essential but are preferable only.

It will be obvious that the members 26 could be insulated from the rim by bands bearing the recesses 27 which bands could each carry a plate connected to one of the wires 21 in which case the conductors 20 and insulation 19 could be omitted and the members 26 could be pressed into contact with the metallic bottom of grooves 25 to complete a circuit.

The entire rim of the wheel and the springs 26 are shown as covered by a casing 28 desirably formed of flexible rubber or the like and provided with ornamental ridges 29 which may serve as guides for the fingers or thumb of the user to indicate where the covering must be pressed upon in order to actuate a desired spring 26 to close a desired circuit.

A plurality of shapes of wheels and correspondingly of casings therefor are shown in Figs. 5 to 8 inclusive.

By use of the invention in the embodiment shown six separate electrical devices may be controlled directly from the steering wheel and in a preferred form of the system three of these circuit closers may be applied to different forms of illumination of the roadway for night driving, two thereof may be appropriated for right and left hand turn signals and the remaining may be appropriated to the sounding of the audible signal. It is obvious that more or less than six circuit closers may be applied to a steering wheel in the manner indicated and that other minor changes may be made in the physical embodiment of the invention without departing from the spirit of the invention within the scope of the appended claims.

I claim:

1. In a device of the class described, in combination, a steering wheel rim formed with a concentric annular groove, contact material fixed in said groove and extending continuously thereabout, a resilient contact in said groove extending continuously thereabout adapted to be pressed into contact with the first named contact at any point in their circumferential extent and means whereby the resilience of the last named contact acts to hold the contacts normally separated.

2. In a device of the class described, in combination, a steering wheel rim formed with a concentric annular groove, contact material fixed in said groove and extending continuously thereabout, a resilient contact in said groove extending continuously thereabout adapted to be pressed into contact with the first named contact at any point in their circumferential extent, means whereby the resilience of the last named contact acts to hold the contacts normally separated, and a flexible material enclosing said rim and covering said groove and resilient contact.

3. In a device of the class described, in combination, a steering wheel rim formed with a concentric annular groove, a portion of said rim of metal adapted to be grounded on the steering column, a contact surface of conducting material extending continuously about the groove and exposed therein, a resilient contact member mounted in said groove adapted to be pressed into contact with said material at any circumferential point, means whereby the resilience of said member acts to hold the same out of contact with said surface, one of said contacts grounded to the metal of the rim and an insulated conductor connected to the remaining contact.

4. In a device of the class described, in combination, a steering wheel rim formed with a concentric annular groove, a portion of the inner circumferential wall of said groove sloping from its bottom toward the central axis of the rim, a stationary electrical conductor extending continuously in said groove, a contractile endless band conductor in said groove normally spaced from said first named conductor by riding upwardly on said sloping surface, contact between said conductors at any point about the rim adapted to close an electrical circuit.

5. In a device of the class described, in combination, a steering wheel rim formed with a concentric annular groove, a portion of the inner circumferential wall of the groove sloping from its bottom toward the central axis of the rim, a portion of said rim of metal adapted to be grounded on a steering column, an exposed surface of contact material extending continuously in said groove and forming one contact element, a second contact element formed as an endless band of helically coiled resilient conducting material normally of less diameter than that of the groove, stretched in said groove and by its contractility riding upwardly on said sloping wall out of contact with said first named contact element, one of said contacts grounded to the metal portion of said rim and an insulated conductor connected to the other thereof.

6. In a device of the class described, in combination, a metallic steering wheel rim formed with a concentric annular groove having a substantially vertical inner wall provided with a continuous recess above its bottom and metallic spokes conductively engaging and supporting said rim and adapted to be grounded on a steering column, a ring of insulating material in the bottom of said groove, a substantially continuous ring of conducting material mounted on and projecting above the surface of said insulating material out of contact with the metal of said rim, an insulated conductor connected to said conducting ring, a contractile endless band of helically formed resilient wire of less normal diameter than that of said groove stretched into said groove and held in said recess by its contractility, out of normal contact with said conductive ring and adapted to be pressed out of said recess into contact with said conductive ring at any point in the circumference of the rim.

7. A motor car steering wheel comprising a rim provided with a relatively deep circumferential groove and a shallow circumferential furrow adjoining said groove, a fixed insulated conducting element at the bottom of said groove, a resilient insulated conducting element disposed in said furrow, whereby said resilient element can be moved into contact with the fixed element so as to close an electric control circuit and means whereby the resilience of said resilient element acts to hold said elements normally separated.

8. A motor car steering wheel comprising in combination a rim provided with a circumferential groove in the under side of its outer part and a circumferential furrow adjacent said groove, an insulated conducting element at the bottom of said groove, a resilient insulated conducting element disposed in said furrow, whereby said resilient element can be moved into contact with the first named element so as to close an electric circuit of a warning apparatus and means whereby the resilience of said resilient element acts to hold said elements normally separated.

9. A motor car steering wheel comprising in combination a rim provided with a relatively deep circumferential groove in the under side of its outer part and a shallow circumferential rounded furrow adjoining the inner edge of said groove, a fixed insulated conducting element at the bottom of said groove and an insulated metallic coil spring placed in said furrow so as to be maintained therein by its own tension, whereby said coil spring can be moved into contact with the fixed element so as to close the electric circuit of a warning apparatus.

10. A motor car steering wheel comprising in combination a rim provided with a relatively deep circumferential groove, a fixed insulated conducting element disposed at the bottom of said groove, a resilient circumferential insulated conducting element disposed adjacent said groove, whereby said last named element can be moved into contact with the fixed element so as to close the electric circuit of a warning apparatus and means whereby the resilience of said resilient element acts to hold said elements normally separated.

11. In a device of the class described, in combination, a steering wheel rim formed with an annular groove, contact material in said groove and extending continuously thereabout, a resilient contact in said groove extending continuously thereabout adapted to be pressed into contact with the first-named contact at any point in their circumferential extent and means whereby the resilience of the last named contact acts to hold the contacts normally separated.

12. In a device of the class described in combination a steering wheel rim formed with a concentric annular groove, contact material fixed in said groove and extending continuously thereabout, a resilient contact in said groove extending continuously thereabout adapted to be pressed into contact with the first named contact at any point in their circumferential extent, means whereby the resilience of the last named contact acts to hold the contacts normally separate and a flexible material placed upon said resilient contact for preventing contact with the resilient contact by the operator's hand.

FRED I. GETTY.